US009762682B2

(12) United States Patent
Lambert et al.

(10) Patent No.: US 9,762,682 B2
(45) Date of Patent: *Sep. 12, 2017

(54) METHODS AND SYSTEMS FOR MANAGING NETWORK ATTACHED STORAGE (NAS) WITHIN A MANAGEMENT SUBSYSTEM

(71) Applicant: Dell Products L.P., Round Rock, TX (US)

(72) Inventors: Timothy M. Lambert, Austin, TX (US); Brian L. Reuter, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 95 days.

This patent is subject to a terminal disclaimer.

(21) Appl. No.: 14/963,443

(22) Filed: Dec. 9, 2015

(65) Prior Publication Data

US 2016/0088098 A1  Mar. 24, 2016

Related U.S. Application Data

(63) Continuation of application No. 11/864,995, filed on Sep. 29, 2007, now Pat. No. 9,244,502.

(51) Int. Cl.
*G06F 15/16* (2006.01)
*H04L 29/08* (2006.01)
*G06F 1/18* (2006.01)
*G06F 3/06* (2006.01)

(52) U.S. Cl.
CPC ............. *H04L 67/16* (2013.01); *G06F 1/181* (2013.01); *H04L 67/1097* (2013.01); *G06F 3/067* (2013.01); *G06F 3/0658* (2013.01)

(58) Field of Classification Search
CPC ............................ H04L 67/1097; G06F 3/067
See application file for complete search history.

(56) References Cited

U.S. PATENT DOCUMENTS

| 6,389,464 | B1 | 5/2002 | Krishnamurthy et al. |
| 6,658,504 | B1 | 12/2003 | Lieber et al. ................... 710/52 |
| 6,985,956 | B2 | 1/2006 | Luke et al. |
| 7,245,629 | B1* | 7/2007 | Yip ......................... H04L 49/40 370/419 |
| 7,509,409 | B2* | 3/2009 | Penny ................... G06F 3/0607 709/215 |
| 2001/0012296 | A1 | 8/2001 | Burgess et al. ............... 370/392 |
| 2002/0075844 | A1 | 6/2002 | Hagen |
| 2004/0078419 | A1 | 4/2004 | Ferrari et al. |
| 2004/0117438 | A1 | 6/2004 | Considine et al. |
| 2005/0129035 | A1 | 6/2005 | Saito ............................ 370/401 |

(Continued)

OTHER PUBLICATIONS

IPMI—Intelligent Platform management Interface Specification Second Generation v2.0. Revision 1.0. Feb. 12, 2004. pp. 1-550.

*Primary Examiner* — John MacIlwinen
(74) *Attorney, Agent, or Firm* — Baker Botts L.L.P.

(57) ABSTRACT

An information handling system (IHS) comprising a chassis, a motherboard disposed within the chassis, a management controller (MC) coupled to the motherboard and a network attached storage (NAS) coupled to the MC wherein the MC provides access to the NAS. An IHS may further include and input/output (I/O) module (IOM) disposed within the chassis, at least one blade and a keyboard video mouse (KVM) module, wherein the NAS is directly accessible to the IOM blade(s) and KVM module.

20 Claims, 4 Drawing Sheets

(56) References Cited

U.S. PATENT DOCUMENTS

| | | | |
|---|---|---|---|
| 2005/0190787 A1 | 9/2005 | Kuik et al. | 370/466 |
| 2006/0095595 A1 | 5/2006 | Dalton et al. | 710/5 |
| 2006/0101372 A1* | 5/2006 | Zhuo | G06F 11/3604 717/100 |
| 2007/0016827 A1* | 1/2007 | Lopez | G06F 11/261 714/31 |
| 2008/0028107 A1* | 1/2008 | Cherian | G06F 3/0607 710/9 |
| 2008/0043769 A1 | 2/2008 | Hirai | 370/420 |
| 2008/0091744 A1 | 4/2008 | Shitomi | |

* cited by examiner

METHODS AND SYSTEMS FOR MANAGING NETWORK ATTACHED STORAGE (NAS) WITHIN A MANAGEMENT SUBSYSTEM

CROSS-REFERENCE TO RELATED APPLICATION

This application is a continuation of application Ser. No. 11/864,995 titled "Methods and Systems for Managing Network Attached Storage (NAS) within a Management Subsystem," filed Sep. 29, 2007, which is incorporated herein by reference.

TECHNICAL FIELD

The present disclosure relates generally to information handling systems. More specifically, but without limitation, the present disclosure relates to network attached storage (NAS).

BACKGROUND INFORMATION

As the value and use of information continues to increase, individuals and businesses seek additional ways to process and store information. One option available to users is an information handling system. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Many information handling systems, particularly servers, possess Management Controllers (MCs). MCs (e.g., baseboard management controllers (BMC) or chassis management controllers (CMCs)) typically interface between system management software and platform hardware to manage data collected from various sensors on the server. These sensors include but are not limited those that detect temperature, fan speeds, and operating system status. MCs can monitor these sensors and alert the system administrator of any irregularities via a network. MCs may regularly access shared storage volumes to perform various actions such as booting from the storage volume, updating firmware and the like.

Currently, shared storage volumes either reside outside the chassis of the server or on MCs themselves and are private to each MC. The arrangement of these storage volumes in this manner may cause inefficiencies in server management. In particular, some MCs may be regularly replaced and are also subject to failover. In these situations, the data on the MCs' storage volumes must somehow be saved or copied to a new location or risk being lost or otherwise inaccessible. Thus, system administrators may have to manually ensure the same data exists across multiple MC storage volumes as a safeguard or develop real-time mirroring algorithms, which burden the MC from performing other tasks.

Additionally, current physical manifestations of the storage volumes and/or media (e.g., FLASH-based management-owned persistent storage) can result in slow write and erase access, thus creating bottlenecks in systems such as modular servers. As the operations in server management become more complex, storage volumes have found it difficult to keep pace in size. Furthermore, they can also wear out over time, which can require removing the MC to access the media versus having direct external access to replace the media. Also, in traditional virtual media, the MC may emulate a Universal Serial Bus (USB) composite mass storage device to a host device, and current implementations can require up to five concurrent storage devices to be emulated. With these implementations, removal of one of the storage devices may disrupt the usage of the remaining storage devices.

Therefore, there is a need for apparatus, systems and methods for adding internal network attached storage (NAS) that the MCs can share and access for their own use and that can scale with current storage demands.

SUMMARY

The following presents a general summary of several aspects of the disclosure and is not an extensive overview of the disclosure. It is not intended to identify key or critical elements of the disclosure or to delineate the scope of the claims. The following summary merely presents some concepts of the disclosure in a general form as a prelude to the more detailed description that follows.

In one aspect, the present disclosure provides an information handling system (IHS) comprising a chassis, a motherboard disposed within the chassis, a management controller (MC) coupled to the motherboard and a network attached storage (NAS) coupled to the MC wherein the MC manages access to the NAS.

Another aspect discloses a method for providing a network attached storage (NAS) to an IHS, the method comprising providing a motherboard coupled to a management controller, wherein the motherboard is disposed within a chassis of the IHS and enabling the management controller to manage access to the NAS.

Yet another illustrative aspect provides a system for adding internal storage to an IHS management subsystem, the system comprising a chassis, a blade disposed within the chassis, a chassis management controller (CMC) coupled to the blade and a network attached storage (NAS) coupled to the CMC, wherein the CMC manages access to the NAS.

BRIEF DESCRIPTION OF DRAWINGS

For detailed understanding of the present disclosure, references should be made to the following detailed description of the several aspects, implementations and/or embodiments, taken in conjunction with the accompanying drawings, in which like elements have been given like numerals and wherein.

DETAILED DESCRIPTION

For purposes of this disclosure, an embodiment of an Information Handling System (IHS) may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an IHS may be a personal computer, a network storage device, or any other suitable device and may vary in size, shape, performance, functionality, and price. The IHS may include random access memory (RAM), one or more processing resources such as a central processing unit (CPU) or hardware or software control logic, ROM, and/or other types of nonvolatile memory. Additional components of the IHS may include one or more disk drives, one or more network ports for communicating with external devices as well as various input and output (I/O) devices, such as a keyboard, a mouse, and a video display. The IHS may also include one or more buses operable to transmit data communications between the various hardware components.

Figure 1:
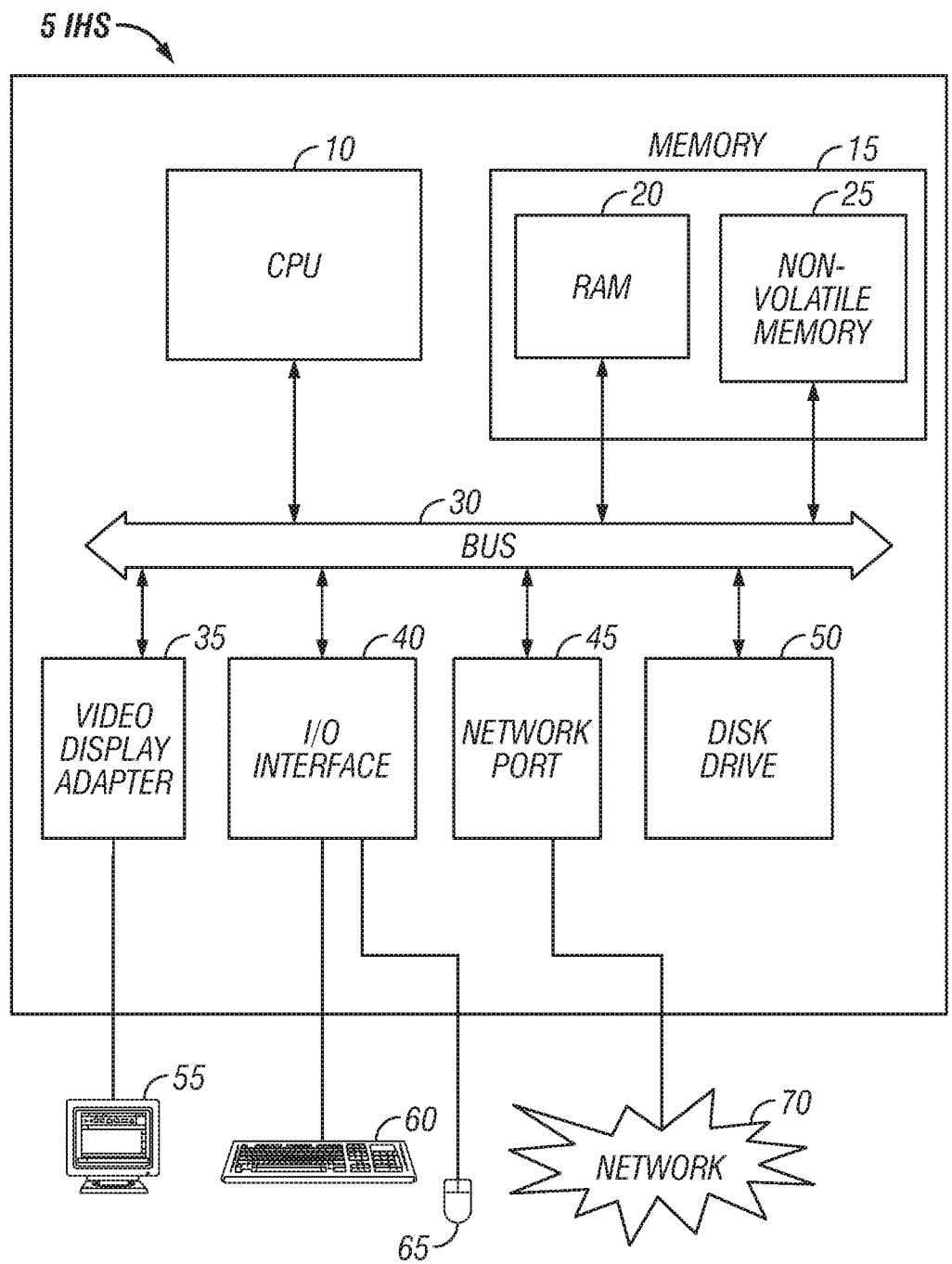
FIG. 1 depicts an illustrative implementation of an information handling system (IHS) in accord with the present disclosure.

FIG. 1 illustrates one possible implementation of an IHS indicated generally at 5 comprising a CPU 10. It should be understood that the present disclosure has applicability to IHSs as broadly described above, and is not intended to be limited to the IHS 5 as specifically described. The CPU 10 may comprise a processor, a microprocessor, minicomputer, or any other suitable device, including combinations and/or a plurality thereof, for executing programmed instructions. The CPU 10 may be in data communication over a local interface bus 30 with components including memory 15 and input/output interfaces 40. The memory 15, as illustrated, may include non-volatile memory 25. The non-volatile memory 25 may include, but is not limited to, firmware flash memory and electrically erasable programmable read-only memory (EEPROM). The firmware program (not shown) may contain, programming and/or executable instructions to control a keyboard 60, mouse 65, video display 55 and/or other input/output devices not shown here. The memory may also comprise RAM 20. The operating system and application programs may be loaded into the RAM 20 for execution.

The IHS 5 may be implemented with a network port 45 to permit communication over a network 75 such as a local area network (LAN) or a wide area network (WAN), such as the Internet. As understood by those skilled in the art, IHS 5 implementations may also include an assortment of ports and interfaces for different peripherals and components, such as video display adapters 35, disk drives port 50, input/output interfaces 40 (e.g., keyboard 60, mouse 65) and the like.

Figure 2A:
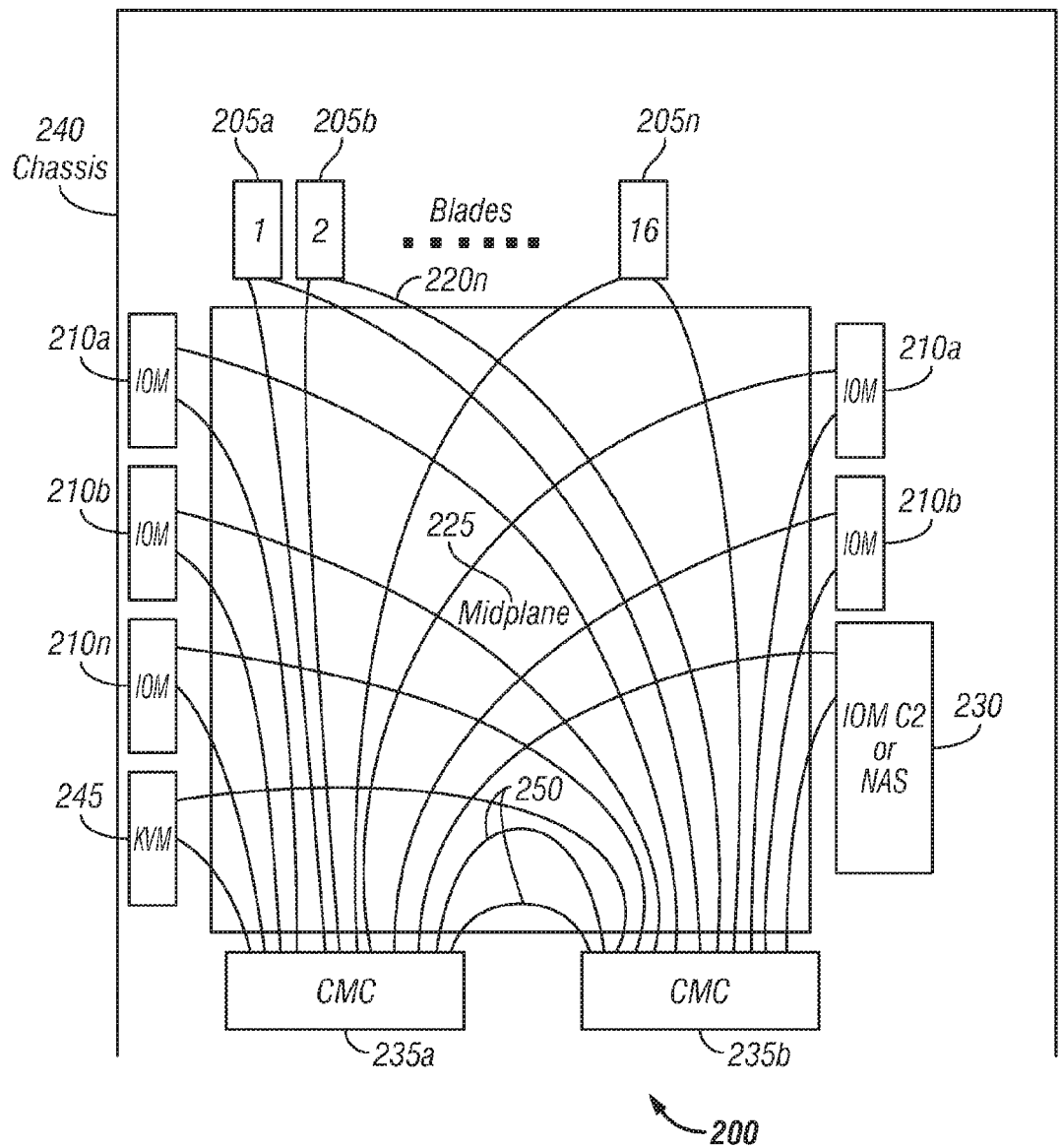
FIG. 2A illustrates one implementation of a modular IHS with network attached storage (NAS) in accord with the present disclosure.

As illustrated in FIG. 2A, a modular IHS 200 in accord with the present disclosure may comprise at least one blade server module or "blades" 205a-n disposed within a chassis 240 and coupled to a midplane 225. One possible implementation, as shown in FIG. 2A, provides a modular IHS 200 comprising 16 blades disposed within a single chassis 240. A person skilled in the relevant art will understand, however, that alternative implementations of modular IHSs can include any number of blades 205a-n disposed within any number chassis 240. Each blade may comprise memory (not shown) and a processor or microcontroller such as a Baseboard Management Controller (BMC) (discussed below).

The midplane 225 typically comprises connectors, resistors and/or traces operable to receive multiple components (e.g., modules, controllers or switches) and can by way of example, be a circuit board. The midplane 225 may allow power to be distributed to components within an IHS 20 and provide a management interface between such components. In another illustrative implementation, the midplane may be coupled to Input/Output Modules (IOMs) 210a-n. The IOMs 210a-n may provide a means by which each blade 205a-n can access one or multiple 110 interfaces such as Keyboard Video Mouse (KVM) (discussed below), I/O fabric or network protocol links 220n (e.g., Gigabit Ethernet, Fibre Channel or InfiniBand) or the like. The IOMs 210a-n translate communication to the blade servers 205a-n into an interface, as represented by the network protocol links 220n, familiar to the blade servers 205a-n. In this manner, the IOMs 210a-n can provide the ability to individually manage each blade 205a-n from outside the chassis 240.

Further coupled to the midplane 225 is a keyboard, video, mouse (KVM) switch module 245 which may be used to connect blades 205a-n to a single mouse 65, keyboard 60 and video monitor 55. A user may select a blade 205a-n to interface with the keyboard 60, video 55 and mouse 65 and the KVM switch module 245 interfaces the signals to allow the selected blade to communicate with the keyboard 60, video 55 and mouse 65. The KVM module 245 may be analog or digital and have hard wired connections such as cables (e.g., USB or VGA) to the keyboard, mouse and video ports of each blade 205a-n. It is also contemplated that the KVM 245 may be used to connect other IHSs to a single mouse 65, keyboard 60 and video monitor 55. Alternatively, a KVM 245 may allow a IHS or single blade 205a-n to be connected to multiple keyboards 60, monitors 55 and mice 65.

Still referring to FIG. 2, a network attached storage (NAS) 230 device may be coupled to the midplane 225 as part of the modular IHS 200. Physical manifestations of the NAS 230 can include, but are not limited to, hard disk drives (HDD), FLASH storage, Redundant Array of Independent/Inexpensive Disks (RAID), storage arrays or any other persistent storage and any combination or plurality thereof. A NAS 230 comprises typical components of an IHS including a processor, motherboard and memory (not shown). In an illustrative implementation, the NAS 230 is constructed in the same form factor as the IOMs 210a-n. Alternatively, the NAS 230 can be implemented in the same form factor as the blades 205a-n or any other suitable form factor. The NAS 230 resides within the chassis 240 and can be accessed by the blades 205a-n, modular components and/or other networked components. In addition to the hardware aspects of the NAS, examples of software components specific to the NAS 230 may include file server services and network administration services. File-based protocols (e.g., NFS or SMB) may be utilized with the NAS 230 device. The NAS 230, devoted primarily to shared storage and provisioning data for a plurality of users throughout multiple operating systems and file systems, may provide centralized storage within a network.

Still referring to FIG. 2, as according to one implementation of the disclosure, at least one chassis management controller (CMCs) 235a,b is coupled to the midplane 225, IOMS 210a-n, NAS 230 and blades 205a-n. It is appreciated by one of skill in the art that any number of CMCs may be present in the IHS 200, CMCs 235a-b may comprise a circuit board that can be connected or plugged into the midplane 225. Current implementations of a modular IHS 200 may have a cross connection 250 between CMCs 235a-b in order to provide storage redundancy and mirroring capabilities. The need for this cross-connection 250 may be obviated by the addition of the NAS 230, which can be shared across all components of the chassis 240 or possibly other chassis and networked components. Additionally, these components may communicate with each other via network protocol links 220n. CMCs 235a,b allow direct management of the entire chassis 240 including, but not limited to, monitoring the temperature, voltage, and fans of various components in the chassis 240. In some implementations, CMCs 235a,b may log specific error occurrences, such as hard disk errors or errors in the memory. They may also be configured to automatically send alert messages under these conditions.

Figure 2B:
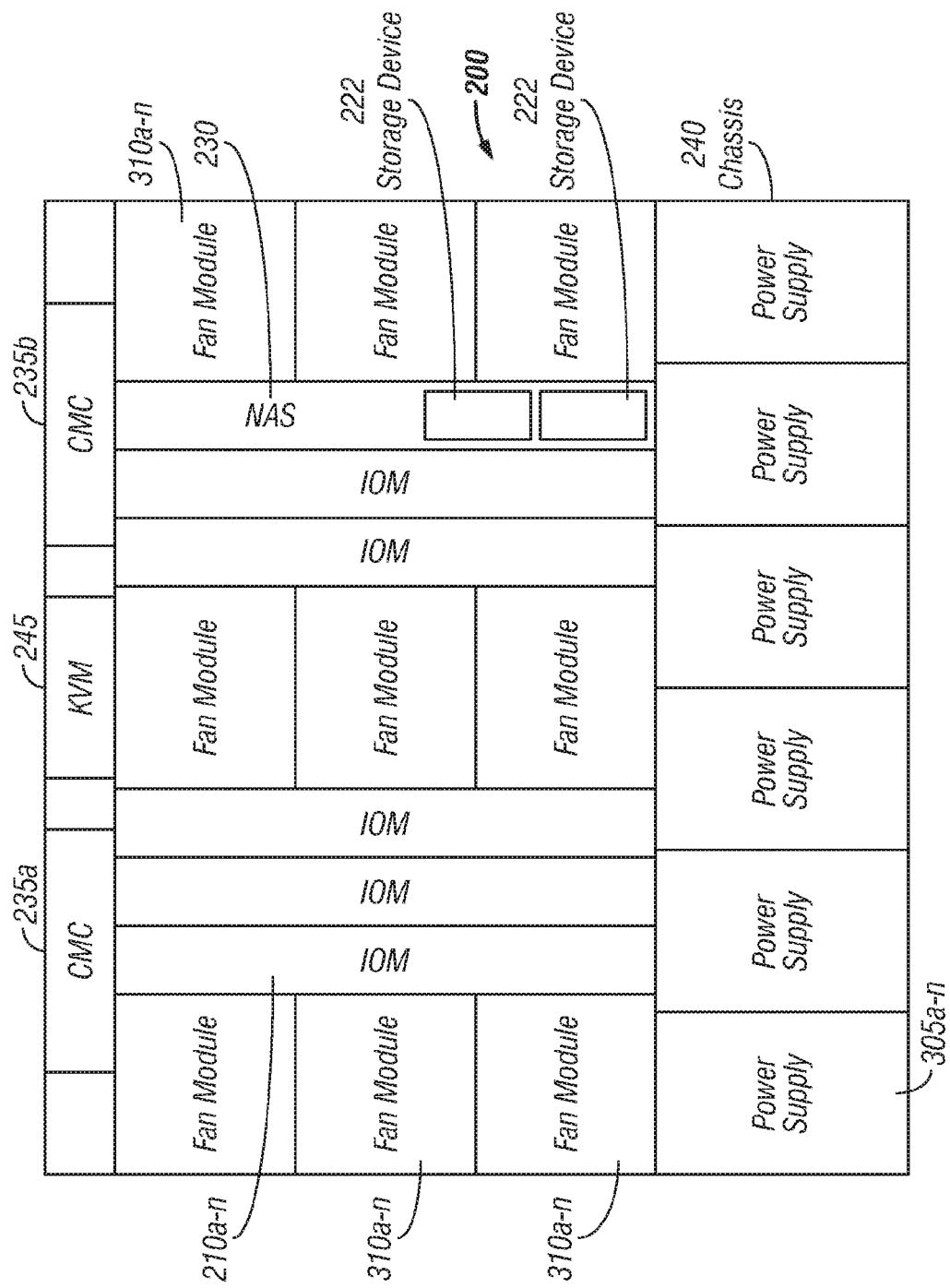
FIG. 2B depicts an alternative view of one implementation of a modular IHS with NAS in accord with the present disclosure.

Now referring to FIG. 2B, there is shown an alternate view of an implementation of a modular IHS indicated generally at 200 and enclosed by the chassis 240. A person of ordinary skill in the art will understand that the arrangement of components in the drawing are merely illustrative and does not serve to limit any other suitable arrangement of modular IHS 200 components. Furthermore, the modular IHS 200 can contain any plurality or combination of the components illustrated. On one portion of the chassis 240 resides power supplies 305 a-n. Shown in FIG. 2B are six power supplies 305 a-n, however, any suitable number of power supplies may be contemplated. The power supplies 305a-n may provide electrical power to any component within the modular IHS 200 or for the entire IHS 200. Adjacent to the power supplies 305a-n are groups of fan modules 310a-n interspersed with groups of IOMs 210a-n. According to one implementation, a NAS 230, in an IOM form factor, is disposed with an IOM slot. A KVM switch module 245 may be disposed between to CMCs 235a,b.

Now referring to FIG. 4, there is shown a monolithic IHS indicated generally at 400. The monolithic IHS 400 may comprise a baseboard management controller (BMC) 405, which can be embedded on a motherboard 445. The BMC 405 provides for management of environmental conditions of the monolithic IHS 400 including but not limited to temperature, voltage, and fan monitoring. In some implementations, the BMC 405 may log specific error occurrences, such as but not limited to hard drive errors or memory errors. It may also automatically send alert messages under these conditions. The BMC 405 may also be coupled with its own large integrated persistent storage 455. The large integrated persistent storage 455 may be embedded on the motherboard 445 and is typically implemented as FLASH memory and managed by the BMC 405.

Figure 3:
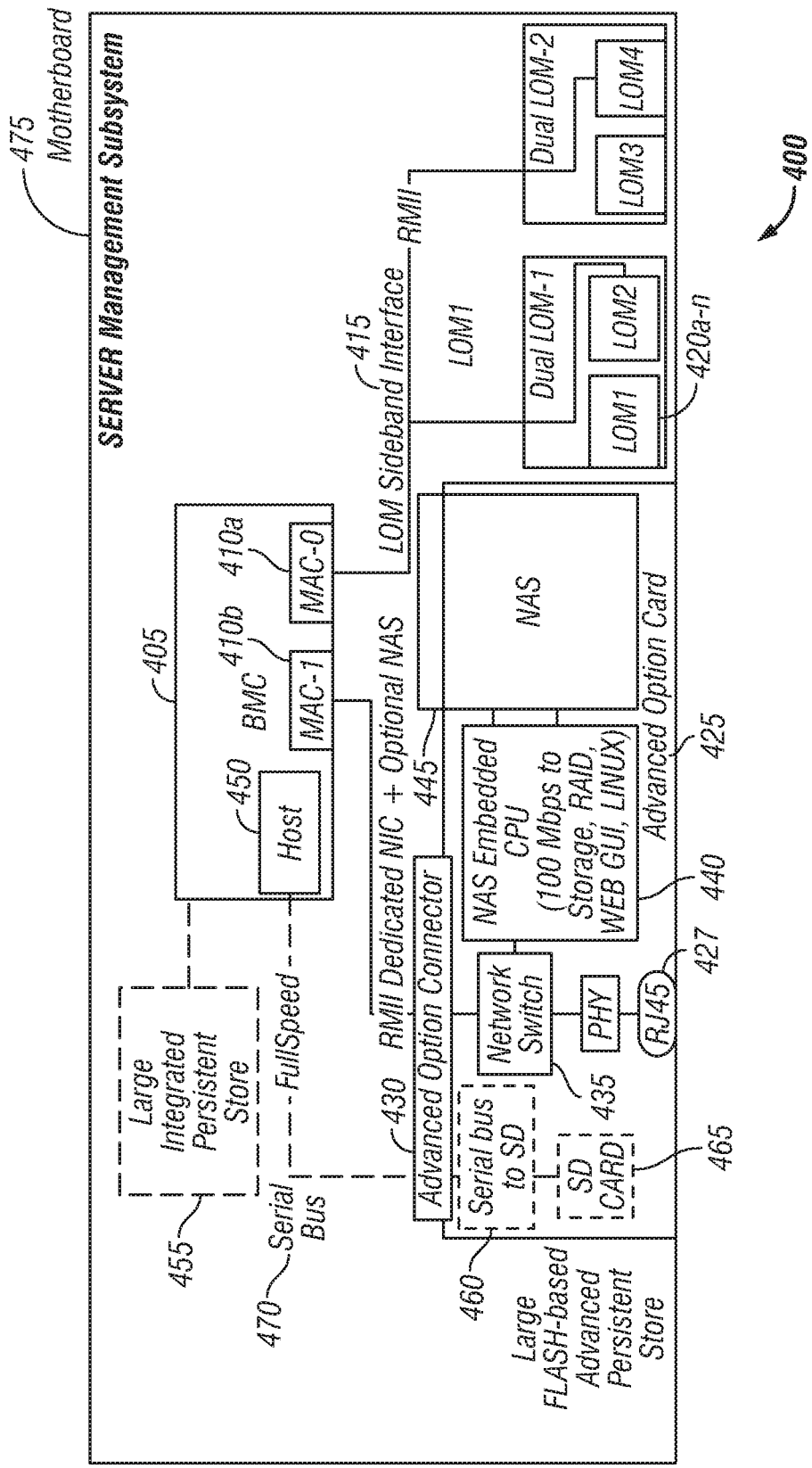
FIG. 3 illustrates one possible implementation of a monolithic IHS with NAS in accord with the present disclosure.

As a non-limiting example, FIG. 4 shows the BMC 405 having two network methods of access, represented by Media Access Control (MAC) addresses 410a,b. MAC addresses 410a,b are quasi-unique identifiers attached to network adapters. It is understood by those skilled in the art that BMCs are not limited to two MAC addresses and can have fewer or more than two MAC addresses. One network method of accessing the BMC 405 may be through the LAN on motherboard (LOM) Sideband Interface 415 through LOMs 420a-n, LOMs 420a-n serve as integrated network controllers embedded on the motherboard 445, and the motherboard can support any number of LOMs 420a-n. The LOM Sideband Interface 415 is a unique interface used for management purposes, separating specialized packets out of incoming network traffic from the LOMs 420a-n and delivering them to the BMC 405. The LOM sideband interface 415 can be mapped to any MAC address 410a,b. As shown in FIG. 3, reduced media independent interface (RMII) provides the physical network interface between the BMC 405 and the LOMs 420a-n or to the switch on the add-in card (for dedicated connection access). Other suitable networking physical media may include media independent interface (MII), serial media independence interface (SMII), ten-bit interface (TBI) and the like.

Another illustrative network method for accessing the BMC 405 may be through an Advanced Option Card (AOC) 425. The AOC 425 allows for a dedicated network interface for management traffic, which remains separate from all other network traffic. The dedicated network interface provides interfacing from a network or switch environment directly to the management controller. Via a network switch 435, the Advanced Option Connector 430 may also be coupled to PHY and an interface for connecting telecommunications or networking equipment, such as, for example, RJ45. The dedicated network interface differs from shared network (e.g., accessing via LOMs 420a-n) in that all management traffic is isolated to a different network interface. Shared network mode via the LOMs 420a-n means that management traffic flows with the in-band traffic for the server host and saves a connection between the server and the network infrastructure. Shared network may additionally provide support for failover such that there is a more reliable traffic path. The AOC 425 may also possess the ability to unlock various features of the motherboard at the option of the user, providing flexibility in management system design. The AOC 425 may be coupled to the motherboard 475 via the Advanced Option Connector 430. Various components may be embedded or integrated onto the AOC 425 including but not limited to a network switch 435, a NAS embedded CPU 440, and NAS 445 or any combination or plurality thereof. Generally, a network switch operates to couple various components of a network. As illustrated in FIG. 4, the network switch 435 couples networked elements to the NAS 445. The NAS embedded CPU 440 can translate network traffic into storage information and manages the NAS 445. The NAS embedded CPU 440 may also run operating systems including, but not limited to, LINUX or other management devices or programs such as RAID, web graphical user interfaces and the like.

The AOC 425 may also have other embedded components such as a serial bus to FLASH converter 460 and its own non-volatile storage (e.g., large FLASH-based persistent storage 465). The serial bus to FLASH converter 460 translates between a serial bus host 450 located on the BMC 405 and the large FLASH-based persistent storage 465 of the AOC 425. The serial bus host 450 and the serial bus to FLASH converter 460 may, as non-limiting examples, be a Universal Serial Bus (USB) host or a USB to FLASH converter. Furthermore, the serial bus host 450 and the serial bus to FLASH converter 460 may communicate through a USS 2.0 FullSpeed interface 470.

The present disclosure also contemplates a method for managing a NAS within an IHS. While the discussion below is intended to illustrate one possible method, it should be appreciated that a number of other methods may be utilized for managing a NAS and all such variations are included within the scope of the present disclosure. Furthermore, various methods are contemplated comprising all or less than all of the steps discussed herein, any number of repeats of any of the steps below, and in any order. The method may include providing a motherboard coupled to a management controller (MC), wherein the motherboard is disposed within a chassis of the IHS and enabling the management controller to manage access to the NAS. The method may future include integrating a network switch and the NAS on an advanced option card, whereby the advanced option card is connectable to the motherboard.

A person of skill in the art would appreciate, upon consideration of the above disclosure and accompanying drawings, that numerous modifications, additions, substitutions, variations, deletions and other changes may be made without departing in any way from the spirit or scope of the present disclosure and/or claims below. The embodiments, implementations and/or aspects of the present disclosure are, therefore, to be considered in all respects as illustrative and not restrictive.

What is claimed is:

1. An information handling system (IHS) comprising:
   a motherboard;
   a management controller (MC) having communication connections, the MC coupled to the motherboard;
   a network attached storage (NAS) coupled to the MC through a dedicated connection of the communication connections, wherein the MC provides access to the NAS through the dedicated connection, wherein the NAS is shared across one or more components of the IHS, and wherein the NAS provides shared storage and provisions data for a plurality of users throughout one or more operating systems and one or more file systems; and
   an advanced option card (AOC) coupled to the motherboard via an advanced option connector, wherein the NAS is integrated on the AOC, and wherein the AOC allows for a dedicated network interface for management traffic such that the management traffic remains separate from all other network traffic.

2. The system of claim 1 further comprising:
   a local area network on motherboard (LOM) coupled to the MC through at least one of a reduced media independent interface (RMII), a media independent interface (MII), a serial media independence interface (SMII), and a ten-bit interface (TBI); and
   LOM sideband interface of the LOM coupled to the MC, wherein the LOM sideband interface provides access to the MC.

3. The system of claim 1, wherein the MC is a baseboard management controller (BMC), and wherein the BMC is in communication with the NAS and the MC via the dedicated connection which comprises an Ethernet interface.

4. The system of claim 3 further comprising:
   a network switch coupled to the BMC, wherein the BMC manages the network switch to selectively control access to the NAS.

5. The system of claim 4, wherein the network switch is integrated on the AOC.

6. The system of claim 1 further comprising:
   a midplane coupled to the NAS, wherein the midplane distributes power to the one or more components; and
   a management interface, provided by the midplane, between the one or more components.

7. The system of claim 6 further comprising:
   a keyboard video mouse (KVM) module coupled to the midplane;
   at least one blade, wherein the at least one blade interfaces with the KVM module; and
   an Input/Output module (IOM) coupled to the midplane, wherein the NAS is directly accessible to at least one of an Input/Output module (IOM), the at least one blade and the KVM module.

8. The system of claim 6, wherein the MC is a chassis management controller (CMC).

9. The system of claim 8 further comprising:
   a circuit board of the CMC, wherein the circuit board is connected to the midplane.

10. A method for managing a network attached storage (NAS) within an information handling system (IHS), the method comprising:
    providing a motherboard coupled to a management controller (MC);
    managing, by the MC, access to the NAS across one or more components of the IHS through a network interface dedicated for management traffic of the MC;
    sharing the NAS across the one or more components;
    providing, by the NAS, shared storage;
    provisioning data, by the NAS, for a plurality of users throughout one or more operating systems and one or more file systems;
    coupling an advanced option card (AOC) to the motherboard via an advanced option connector;
    providing, by the AOC, a dedicated network interface for management traffic such that the management traffic remains separate form all other network traffic; and
    wherein the NAS is integrated on the AOC.

11. The method of claim 10 further comprising:
    coupling a local area network on motherboard (LOM) to the MC through at least one of a reduced media independent interface (RMII), a media independent interface (MII), a serial media independence interface (SMII), and a ten-bit interface (TBI); and
    accessing the MC via a LOM sideband interface of the LOM.

12. The method of claim 10, wherein the MC is a baseboard management controller (BMC), and wherein the BMS communicates with the NAS and the MC via the dedicated connection which comprises an Ethernet interface.

13. The method of claim 12 further comprising:
    coupling a network switch to the BMC; and
    managing the network switch, by the BMC, to selectively control access to the NAS.

14. The method of claim 13, wherein the network switch is integrated on the AOC.

15. The method of claim 10 further comprising:
    coupling a midplane to the NAS;
    distributing power, by the midplane, to the one or more components; and
    providing, by the midplane, a management interface between the one or more components.

16. The method of claim 15 further comprising:
    providing communications between at least one blade, at least one Input/Output module (IOM), and the NAS; and
    managing access to the at least one NAS via the MC.

17. A system for adding internal storage to an IHS management subsystem, the system comprising:
    a blade;
    a midplane coupled to the blade, wherein the midplane distributes power to one or more components of the IHS management subsystem;
    a management controller (MC) coupled to the midplane;
    a network attached storage (NAS) coupled to the MC, wherein the MC manages access to the NAS across one or more components of the IHS management subsystem through a network interface dedicated for management traffic of the MC, wherein the NAS is shared across the one or more components, wherein the NAS provides shared storage and provisions data for a plurality of users throughout one or more operating systems and one or more file systems; and an advanced option card (AOC) coupled to a motherboard via an advanced option connector, wherein the NAS is integrated on the AOC, and wherein the AOC allows for a dedicated network interface for management traffic such that the management traffic remains separate from all other network traffic.

18. The system of claim 17 further comprising:
an Input/Output module (IOM) slot, wherein the NAS is an IOM form factor, and wherein the NAS is disposed within the IOM slot.

19. The system of claim 17 further comprising:
an advanced option connector coupled to the AOC and the motherboard; and
a network switch of the AOC coupled to at least one of the one or more components.

20. The system of claim 17 further comprising:
a serial bus to flash converter of the AOC, wherein the serial bus to flash converter translates between a serial bus host located on the MC and a storage of the AOC.

* * * * *